W. COMPTON.
Preserving Liquors.
No. 59,188.
Patented Oct. 30, 1866.
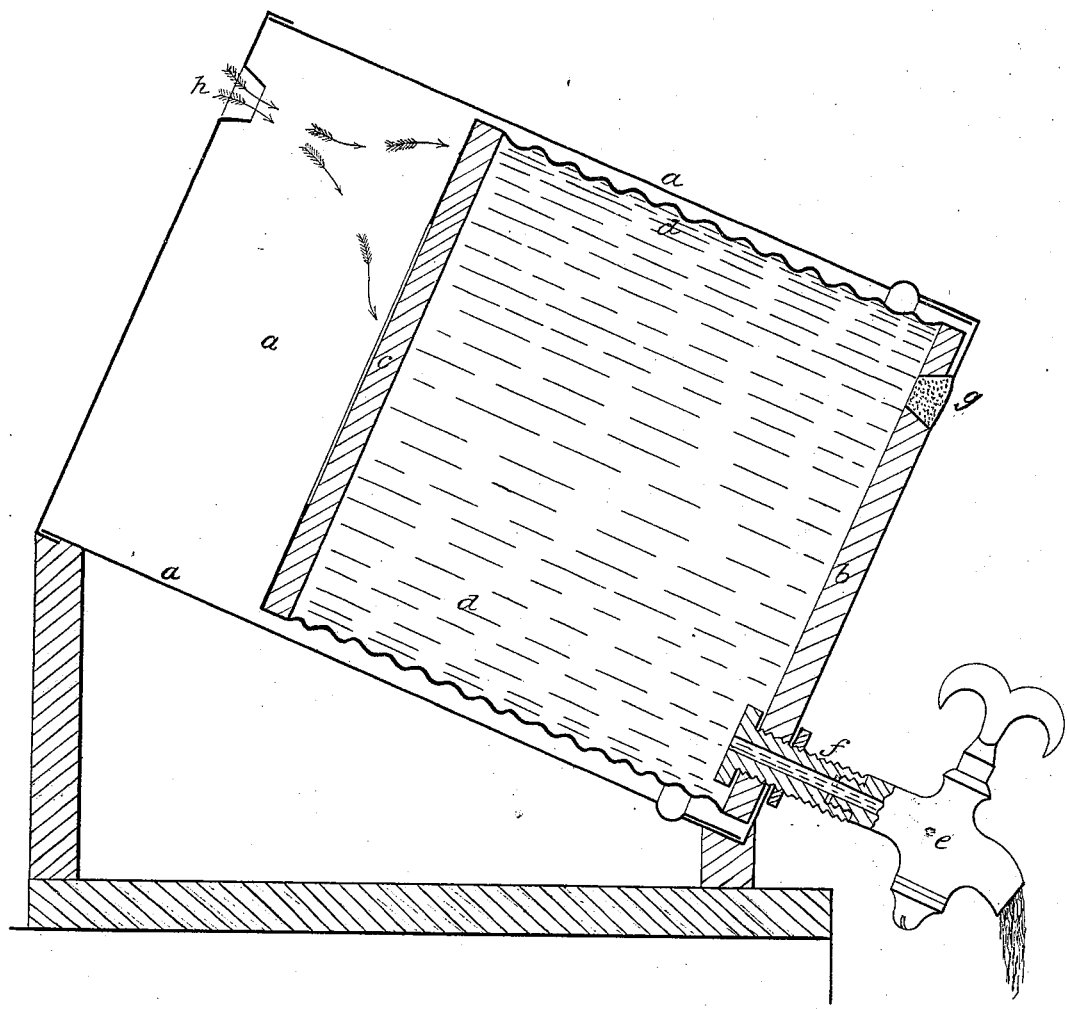
Witnesses:
Geo. D. Walker
Chas. H. Smith.
Inventor:
Wm. Compton.

UNITED STATES PATENT OFFICE.

WILLIAM COMPTON, OF NEW YORK, N. Y.

IMPROVED VESSEL FOR BEER, &c.

Specification forming part of Letters Patent No. 59,188, dated October 20, 1866.

*To all whom it may concern:*

Be it known that I, WILLIAM COMPTON, of the city and State of New York, have invented, made, and applied to use a certain new and useful Improvement in Vessels for Containing Beer and other Liquids; and I do hereby declare the following to be a full, clear, and exact description of my said invention, reference being had to the annexed drawing, making part of this specification, wherein I have represented sectionally my improved vessel for containing beer or other liquids.

Beer, ale, porter, and liquids of that character kept in casks and barrels are apt to be injuriously affected by atmospheric action, and the said liquid cannot run out of the vessel containing the same without air passing into the vessel.

The object of my improvement is to allow the beer or other liquid to run out of the barrel or other vessel freely, and at the same time entirely prevent the inlet of air to the liquid itself.

This object I accomplish by means of a flexible air-tight bag introduced within such vessel; and to this my invention relates.

In the drawing, $a$ represents a cask or vessel of any desired kind, with a head, $b$, to which a bag of india-rubber or other elastic waterproof fabric is attached, as shown at $d$; and $c$ is a second movable head, to which the other end of the bag $d$ is attached. $e$ is the faucet or cock attached to the thimble $f$, that passes through the head $b$. A bung-hole or filling-opening may be provided at $g$.

It will now be understood that the beer or other liquid is to be contained in the bag $d$, and the barrel $a$ or vessel containing said bag protects it from injury, and the bag contracts or collapses as the liquid is drawn out, thereby preventing the atmosphere coming in contact with the contents of said bag, so that the beer or other liquid will not be injured.

The cask or vessel may be inclined, as shown, or stand in any other desired position, and an opening should be provided, as at $h$, to admit air between the cask and flexible bag.

If the cask stands vertically, strings may be attached to the movable head $c$, to draw that up and aid in distending the flexible bag while the same is being filled.

The character of faucet employed and its mode of attachment may be varied as circumstances require; and, if desired, the staves of the cask or vessel may extend sufficiently beyond the head to protect the faucet from injury.

What I claim, and desire to secure by Letters Patent, is—

The flexible bag fitted, as specified, within a vessel, and adapted to the reception of beer and other liquids, and the exclusion of the same from contact with the air, as set forth.

In witness whereof I have hereunto set my signature this 3d day of February, A. D. 1866.

WM. COMPTON.

Witnesses:
   GEO. D. WALKER,
   CHAS. H. SMITH.